(12) United States Patent
Hwang et al.

(10) Patent No.: US 7,359,437 B2
(45) Date of Patent: Apr. 15, 2008

(54) ENCODING METHOD AND SYSTEM FOR REDUCING INTER-SYMBOL INTERFERENCE EFFECTS IN TRANSMISSION OVER A SERIAL LINK

(75) Inventors: Seung Ho Hwang, Palo Alto, CA (US); Jano Banks, Cupertino, CA (US); Paul Daniel Wolf, San Carlos, CA (US); Eric Lee, San Jose, CA (US); Baegin Sung, Sunnyvale, CA (US); Albert M. Scalise, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1333 days.

(21) Appl. No.: 10/036,234

(22) Filed: Dec. 24, 2001

(65) Prior Publication Data

US 2003/0048851 A1    Mar. 13, 2003

Related U.S. Application Data

(63) Continuation-in-part of application No. 09/954,663, filed on Sep. 12, 2001.

(51) Int. Cl.
*H04B 1/66* (2006.01)

(52) U.S. Cl. ............ 375/240; 375/240.01; 375/240.23; 375/246; 375/254; 375/296; 348/423.1; 348/470

(58) Field of Classification Search ................ 375/219, 375/220, 240, 240.01, 240.23, 244, 246, 375/253, 254, 260, 285, 295, 296, 346, 348; 348/388, 398.1, 423.1, 470, 476, 477, 487
See application file for complete search history.

(56) References Cited

U.S. PATENT DOCUMENTS 5,150,211 A    9/1992    Charbonnel et al. ........ 358/143

(Continued)

FOREIGN PATENT DOCUMENTS

WO    WO 00/16525    3/2000

OTHER PUBLICATIONS

Goldie, John, "*LVDS based FPD-Link spans industries with Gigabits @ milliwatts!*", National Semiconductor Corporation, Online!, May 1, 2001, pp. 1 to 6, from http://www.national.com/nationaledge/may01/lvds.html.

(Continued)

*Primary Examiner*—Dac V. Ha
(74) *Attorney, Agent, or Firm*—Girard & Equitz LLP

(57) ABSTRACT

A communication system including a transmitter, a receiver, and a serial link, in which encoded data (e.g., encoded video data and encoded auxiliary data) are transmitted from the transmitter to the receiver. The serial link can but need not be a TMDS or TMDS-like link. In typical embodiments, alternating bursts of encoded video data and encoded auxiliary data are transmitted over each of one or more channels of the link. Other aspects of the invention are transmitters for use in encoding data for transmission over a serial link, and methods for sending encoded data over a serial link. In accordance with the invention, the data to be transmitted are encoded using a subset (sometimes referred to as a selected set of code words) of a full set of code words. The selected set of code words is selected such that each stream of encoded data (comprising only such code words) transmitted over a serial link has a bit pattern that is less susceptible to inter-symbol interference ("ISI") during transmission than is the bit pattern determined by a conventionally encoded version of the same data (comprising not only the selected set of code words but also other members of the full set). In general, the best choice for the selected set of code words selected from a full set of binary code words depends on the particular coding implemented by the full set. Typically, the selected set of code words includes words whose serial patterns (during transmission) have fewer contiguous zeros and ones (and thus are less susceptible to ISI during transmission) than do those code words in the full set that are not selected. In preferred embodiments in which the bits of the selected set of code words are transmitted over a serial link as sequences of rising and falling voltage transitions, the bit pattern of each transmitted stream of the selected set of code words implements DC balancing to limit the voltage drift over time.

53 Claims, 5 Drawing Sheets

U.S. PATENT DOCUMENTS

| | | | |
|---|---|---|---|
| 5,199,030 A | 3/1993 | Ueda | 370/68 |
| 5,491,479 A | 2/1996 | Wilkinson | 341/58 |
| 5,506,932 A | 4/1996 | Holmes et al. | 395/2.14 |
| 5,523,795 A | 6/1996 | Ueda | 348/480 |
| 5,541,662 A | 7/1996 | Adams et al. | 348/460 |
| 5,625,644 A * | 4/1997 | Myers | 375/242 |
| 5,703,580 A | 12/1997 | Ko | 341/59 |
| 5,905,769 A | 5/1999 | Lee et al. | 375/376 |
| 5,940,070 A | 8/1999 | Koo | 345/302 |
| 5,974,464 A | 10/1999 | Shin et al. | 709/231 |
| 6,052,072 A * | 4/2000 | Tsang et al. | 341/59 |
| 6,141,691 A | 10/2000 | Frink et al. | 709/233 |
| 6,185,250 B1 | 2/2001 | Wang et al. | 66/62 |
| 6,191,822 B1 | 2/2001 | Smyers | 348/552 |
| 6,208,715 B1 | 3/2001 | Haavisto | 379/88.07 |
| 6,241,778 B1 | 6/2001 | de Lind van Wijngaarden et al. | 341/58 |
| 6,249,669 B1 | 6/2001 | Ogino et al. | 455/63 |
| 6,301,221 B1 * | 10/2001 | Paterson | 370/208 |

OTHER PUBLICATIONS

Siegel, P.H., "*Recording Codes For Digital Magnetic Storage*", IEEE Transactions On Magnetics, MAG-21, No. 5, Sep. 1985, pp. 1344-1349.

*High-Bandwidth Digital Content Protection System*, Revision 1.0, by Intel Corporation, Feb. 17, 2000, pp. 1-60.

*High-Bandwidth Digital Content Protection System Revision 1.0 Erratum*, by Intel Corporation, Mar. 19, 2001, pp. 1-9.

*Upstream Link for High-bandwidth Digital Content Protection*, Revision 1.00, by Intel Corporation, Jan. 26, 2001, pp. 1-38.

Lieberman, David "PC Video Interface Looks to Add Audio Capability", *EE Times* (Mar. 26, 2001, 11:57 a.m. EST), pp. 1-3, downloaded from the Internet on May 23, 2001 from http://www.eetimes.com/story/OEG20010326S0029.

Silicon Image, Inc., "*Silicon Image First to Couple Digital Audio and Video on the DVI Link*", Sunnyvale, Jan. 16, 2001, pp. 1-4, downloaded from the Internet on May 22, 2001 from http://www.siimage.com/press/01_16_01.asp.

Silicon Image, Inc., "*CE Industry Heavyweights Proclaim DVI HDCP as the Interface for HDTV-Further Propelling Silicon Image into the CE Space*", Las Vegas, Jan. 4, 2001, pp. 1-4, downloaded from the Internet on May 22, 2001 from http://www.siimage.com/press/01_04_01a.asp.

"White Paper on the MB810 Line Code for 10GbE", Dae Young Kim, Changoo Lee, Chun Sik Shin, Hae Won Jung, and Hyeong Ho Lee, IEEE 802.3 high Speed Study Group, Sep. 1999 Interim meeting, Sep. 29, 1999.

* cited by examiner

| | Input D7–D0 | Hex | TMDS pattern |
|---|---|---|---|
| PRE-DATA GUARD BAND for Aux data | 01010101 | 55 | 1100110010 |
| AD0 | 01011011 | 5B | 0011100101 |
| AD1 | 10110101 | B5 | 0110001101 |
| AD2 | 11010011 | D3 | 0010011101 |
| AD3 | 11011001 | D9 | 0100011101 |
| AD4 | 01101101 | 6D | 0111000101 |
| AD5 | 10100100 | A4 | 0011100110 |
| AD6 | 10010010 | 92 | 0111000110 |
| AD7 | 01000100 | 44 | 0011110010 |
| AD8 | 00100010 | 22 | 0111100010 |
| AD9 | 01001011 | 4B | 1001110010 |
| AD10 | 10010011 | 93 | 1000111010 |
| GUARD BAND for video data and POST-DATA GUARD BAND for Aux data (and AD11) | 10101011 | AB | 0011001101 |
| AD12 | 01011010 | 5A | 1100011001 |
| AD13 | 01101100 | 6C | 1000111001 |
| AD14 | 10100101 | A5 | 1100011010 |
| AD15 | 10111010 | BA | 1100001101 |

| Specific CTL | CTL [1:0] | Preamble (q0:q9) | Guardband (q0:q9) | GB (d7:d0) | Purpose |
|---|---|---|---|---|---|
| R (CTL [3:2]) | 00 | 0010101011 | 0011001101 | 0xAB | Video Preamble/Video Guardband/Post-Data Aux Guardband |
| G (CTL [1:0]) | 00 | 0010101011 | 0011001101 | 0xAB | Video Preamble/Video Guardband/Post-Data Aux Guardband |
| B (VSYNC:HSYNC) | XX | 1 of 4 values | 0011001101 | 0xAB | Video Preamble/Video Guardband |
| R (CTL [3:2]) | 01 | 1101010100 | 1100110010 | 0x55 | Aux Preamble/Pre-Data Aux Guardband |
| G (CTL [1:0]) | 10 | 0010101010 | 1100110010 | 0x55 | Aux Preamble/Pre-Data Aux Guardband |
| B (VSYNC:HSYNC) | XX | 1 of 4 values | 1 of 4 values | 0x5B, 0xB5, 0xD3, 0xD9 | Aux Preamble/Pre- or Post-Data Aux Guardband |
| R (CTL [3:2]) | 10 | 0010101010 | | | VSync Window, HDCP enabled |
| G (CTL [1:0]) | 00 | 0010101011 | | | VSync Window, HDCP enabled |
| B (VSYNC:HSYNC) | XX | 1 of 4 values | | | VSync Window, HDCP enabled |

FIG. 3

ENCODING METHOD AND SYSTEM FOR REDUCING INTER-SYMBOL INTERFERENCE EFFECTS IN TRANSMISSION OVER A SERIAL LINK

CROSS REFERENCE TO RELATED APPLICATION

This application is a continuation-in-part of pending U.S. patent application Ser. No. 09/954,663, filed on Sep. 12, 2001, and assigned to the assignee of the present application.

TECHNICAL FIELD OF THE INVENTION

The invention pertains to transmission of encoded data (e.g., one or both of video data and auxiliary data such as audio data) over a serial link, in such a manner as to reduce the bit error rate resulting from inter-symbol interference or other error-causing effects during transmission. In some embodiments, the serial link is a transition minimized differential signaling ("TMDS") link, or a link having some but not all of the characteristics of a TMDS link.

BACKGROUND OF THE INVENTION

Elements of this invention are based upon properties of a serial link. Various serial links for transmitting data and clock signals are well known.

One conventional serial link, used primarily for high-speed transmission of video data from a host processor (e.g., a personal computer) to a monitor, is known as a transition minimized differential signaling interface ("TMDS" link). The characteristics of a TMDS link include the following:

1. video data are encoded and then transmitted as encoded words (each 8-bit word of digital video data is converted to an encoded 10-bit word before transmission);
   a. the encoding determines a set of "in-band" words and a set of "out-of-band" words (the encoder can generate only "in-band" words in response to video data, although it can generate "out-of-band" words in response to control or sync signals. Each in-band word is an encoded word resulting from encoding of one input video data word. All words transmitted over the link that are not in-band words are "out-of-band" words);
   b. the encoding of video data is performed such that the in-band words are transition minimized (a sequence of in-band words has a reduced or minimized number of transitions);
   c. the encoding of video data is performed such that the in-band words are DC balanced (the encoding prevents each transmitted voltage waveform that is employed to transmit a sequence of in-band words from deviating by more than a predetermined threshold value from a reference potential. Specifically, the tenth bit of each "in-band" word indicates whether eight of the other nine bits thereof have been inverted during the encoding process to correct for an imbalance between running counts of ones and zeroes in the stream of previously encoded data bits);
2. the encoded video data and a video clock signal are transmitted as differential signals (the video clock and encoded video data are transmitted as differential signals over conductor pairs);
3. three conductor pairs are employed to transmit the encoded video, and a fourth conductor pair is employed to transmit the video clock signal; and
4. signal transmission occurs in one direction, from a transmitter (typically associated with a desktop or portable computer, or other host) to a receiver (typically an element of a monitor or other display device).

A use of the TMDS serial link is the "Digital Visual Interface" interface ("DVI" link) adopted by the Digital Display Working Group. It will be described with reference to FIG. 1. A DVI link can be implemented to include two TMDS links (which share a common conductor pair for transmitting a video clock signal) or one TMDS link, as well as additional control lines between the transmitter and receiver. The DVI link of FIG. 1 includes transmitter 1, receiver 3, and the following conductors between the transmitter and receiver: four conductor pairs (Channel 0, Channel 1, and Channel 2 for video data, and Channel C for a video clock signal), Display Data Channel ("DDC") lines for bidirectional communication between the transmitter and a monitor associated with the receiver in accordance with the conventional Display Data Channel standard (the Video Electronics Standard Association's "Display Data Channel Standard," Version 2, Rev. 0, dated Apr. 9, 1996), a Hot Plug Detect (HPD) line (on which the monitor transmits a signal that enables a processor associated with the transmitter to identify the monitor's presence), Analog lines (for transmitting analog video to the receiver), and Power lines (for providing DC power to the receiver and a monitor associated with the receiver). The Display Data Channel standard specifies a protocol for bidirectional communication between a transmitter and a monitor associated with a receiver, including transmission by the monitor of an Extended Display Identification ("EDID") message that specifies various characteristics of the monitor, and transmission by the transmitter of control signals for the monitor. Transmitter 1 includes three identical encoder/serializer units (units 2, 4, and 6) and additional circuitry (not shown). Receiver 3 includes three identical recovery/decoder units (units 8, 10, and 12) and inter-channel alignment circuitry 14 connected as shown, and additional circuitry (not shown).

As shown in FIG. 1, circuit 2 encodes the data to be transmitted over Channel 0, and serializes the encoded bits. Similarly, circuit 4 encodes the data to be transmitted over Channel 1 (and serializes the encoded bits), and circuit 6 encodes the data to be transmitted over Channel 2 (and serializes the encoded bits). Each of circuits 2, 4, and 6 responds to a control signal (an active high binary control signal referred to as a "data enable" or "DE" signal) by selectively encoding either digital video words (in response to DE having a high value) or a control or synchronization signal pair (in response to DE having a low value). Each of encoders 2, 4, and 6 receives a different pair of control or synchronization signals: encoder 2 receives horizontal and vertical synchronization signals (HSYNC and VSYNC); encoder 4 receives control bits CTL0 and CTL1; and encoder 6 receives control bits CTL2 and CTL3. Thus, each of encoders 2, 4, and 6 generates in-band words indicative of video data (in response to DE having a high value), encoder 2 generates out-of-band words indicative of the values of HSYNC and VSYNC (in response to DE having a low value), encoder 4 generates out-of-band words indicative of the values of CTL0 and CTL1 (in response to DE having a low value), and encoder 6 generates out-of-band words indicative of the values of CTL2 and CTL3 (in response to DE having a low value). In response to DE having a low value, each of encoders 4 and 6 generates one of four specific out-of-band words indicative of the values 00, 01, 10, or 11, respectively, of control bits CTL0 and CTL1 (or CTL2 and CTL3).

It has been proposed to encrypt video data transmitted over a serial link. For example, it has been proposed to use a cryptographic protocol known as "High-bandwidth Digital Content Protection" ("HDCP") to encrypt digital video to be transmitted over a DVI link and to decrypt the data at the DVI receiver. A DVI transmitter implementing HDCP outputs a 24-bit bus, known as cout[23:0], during the video active period (i.e. when DE is high). This 24-bit cout data is "Exclusive Ored" (in logic circuitry in the transmitter) with the 24-bit RGB video data input to the transmitter in order to encrypt the video data. The encrypted data is then encoded (according to the TMDS standard) for transmission. The same cout data is also generated in the receiver. After the encoded and encrypted data received at the receiver undergoes TMDS decoding, the cout data is processed together with the decoded video in logic circuitry in order to decrypt the decoded data and recover the original input video data.

Before the transmitter begins to transmit HDCP encrypted, encoded video data, the transmitter and receiver communicate bidirectionally with each other to execute an authentication protocol (to verify that the receiver is authorized to receive protected content, and to establish shared secret values for use in encryption of input data and decryption of transmitted encrypted data). After the receiver has been authenticated, the transmitter calculates the initial set of encryption keys (for encrypting the first line of input video data) in response to a control signal and sends the control signal to the receiver (during each vertical blanking period, when DE is low) to cause the receiver to calculate an initial set of decryption keys (for decrypting the first received and decoded line of transmitted video data). Following generation of the initial set of encryption/decryption keys, each of the transmitter and receiver performs a re-keying operation during each blanking (vertical or horizontal) interval to generate a new set of keys for encrypting (or decrypting) the next line of video data, and actual encryption of input video data (or decryption of received, decoded video data) is performed using the latest set of keys only when DE is high (not during the blanking intervals).

Each of the transmitter and receiver includes an HDCP cipher circuit (sometimes referred to herein as an "HDCP cipher") including a linear feedback shift register (LFSR) module, a block module coupled to the output of the LFSR module, and an output module coupled to an output of the block module. The LFSR module is employed to re-key the block module in response to each assertion of an enable signal, using a session key (Ks) and frame key (Ki). The block module generates (and provides to the LFSR module) the key Ks at the start of a session and generates (and applies to the LFMS module) a new value of key Ki at the start of each frame of video data (in response to a rising edge of a control signal which occurs in the first vertical blanking interval of a frame).

The block module comprises two halves, known as "Round Function K" and "Round Function B." Round Function K includes 28-bit registers Kx, Ky, and Kz, seven S-Boxes (each a 4 input bit by 4 output bit S-Box including a look-up table), and a linear transformation unit K. Round Function B includes 28-bit registers Bx, By, and Bz, seven S-Boxes (each a 4 input bit by 4 output bit S-Box including a look-up table), and a linear transformation unit B. Round Function K and Round Function B are similar in design, but Round Function K performs one round of a block cipher per clock cycle to assert (to the output module) a different pair of 28-bit round keys (Ky and Kz) each clock cycle in response to the output of the LFSR module, and Round Function B performs one round of a block cipher per clock cycle, in response to each 28-bit round key Ky from Round Function K and the output of the LFSR module, to assert (to the output module) a different pair of 28-bit round keys (By and Bz) each clock cycle. The transmitter generates value An at the start of the authentication protocol and the receiver responds to it during the authentication procedure. The value An is used to randomize the session key. The block module operates in response to the authentication value (An) and an initialization value (Mi, also referred to as an integrity verification key) which is updated by the output module at the start of each frame.

Each of linear transformation units K and B outputs 56 bits per clock cycle. These output bits are the combined outputs of eight diffusion networks in each transformation unit. Each diffusion network of linear transformation unit K produces seven output bits in response to seven of the current output bits of registers Ky and Kz. Each of four of the diffusion networks of linear transformation unit B produces seven output bits in response to seven of the current output bits of registers By, Bz, and Ky, and each of the four other diffusion networks of linear transformation unit B produces seven output bits in response to seven of the current output bits of registers By and Bz.

The output module performs a compression operation on the 28-bit keys (By, Bz, Ky and Kz) asserted to it (a total of 112 bits) by the block module during each clock cycle, to generate one 24-bit block of pseudo-random bits cout[23:0] per clock cycle. Each of the 24 output bits of the output module consists of the exclusive OR ("XOR") of nine terms.

In the transmitter, logic circuitry receives each 24-bit block of cout data and each input 24-bit RGB video data word, and performs a bitwise XOR operation thereon in order to encrypt the video data, thereby generating a word of encrypted RGB video data. Typically, the encrypted data subsequently undergoes TMDS encoding before it is transmitted to a receiver. In the receiver, logic circuitry receives each 24-bit block of cout data and each recovered 24-bit RGB video data word (after the recovered data has undergone TMDS decoding), and performs a bitwise XOR operation thereon in order to decrypt the recovered video data.

Throughout the specification the expression "TMDS-like link" will sometimes be used to denote a serial link capable of transmitting encoded data (e.g., encoded digital video data) and a clock for the encoded data, from a transmitter to a receiver, and optionally also capable of transmitting (bidirectionally or unidirectionally) one or more additional signals (e.g., encoded digital audio data or other encoded data) between the transmitter and receiver, that is or includes either a TMDS link or a link having some but not all of the characteristics of a TMDS link. There are several conventional TMDS-like links.

Some TMDS-like links encode input video data (and other data) to be transmitted into encoded words comprising more bits than the incoming data using a coding algorithm other than the specific algorithm used in a TMDS link, and transmit the encoded video data as in-band characters and the other encoded data as out-of-band characters. The characters need not be classified as in-band or out-of-band characters based according to whether they satisfy transition minimization and DC balance criteria. Rather, other classification criteria could be used. An example of an encoding algorithm, other than that used in a TMDS link but which could be used in a TMDS-like link, is IBM 8b10b coding. The classification (between in-band and out-of-band characters) need not be based on just a high or low number of transitions. For example, the number of transitions of each of the in-band and out-of-band characters could (in some embodiments) be in a single range (e.g., a middle range defined by a minimum and a maximum number of transitions).

The data transmitted between the transmitter and receiver of a TMDS-like link can, but need not, be transmitted differentially (over a pair of conductors). Also, although a TMDS link has four differential pairs (in the single pixel version), three for video data and the other for a video clock, a TMDS-like link could have a different number of conductors or conductor pairs.

Typically, the primary data transmitted by a TMDS link are video data. What is often significant about this is that the video data are not continuous, and instead have blanking intervals. These blanking intervals provide an opportunity (exploited in some embodiments of the present invention) for auxiliary data to be transported, and they represent unused bandwidth. However, many serial links do not transmit data having blanking intervals, and thus do not encode input data (for transmission) in response to a data enable signal. For example, audio serial links would typically transmit continuous data.

The expression "auxiliary data" is used in a broad sense herein to denote digital audio data or any other type of data other than video data and timing information for video data (e.g., a video clock). For example, timing information for audio data (e.g., a clock for recovering transmitted audio data) falls within the scope of "auxiliary data." Other examples of "auxiliary data" transmitted in accordance with the invention include computer keyboard signals, still image data (generated by a camera, for example), text data, control signals for a power supply, picture in picture data, monitor control information (audio volume, brightness, power state), control signals for indicator lights on a monitor or keyboard, non-audio or video control information, etc.

The term "stream" of data, as used herein, denotes that all the data are of the same type and is transmitted with the same clock frequency. The term "channel," as used herein, refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link. Because it is desirable to transmit many different streams of auxiliary data in important applications of the invention, preferred embodiments of the invention provide multiple channels for transmission of auxiliary data, including channels for transmission of auxiliary data in both directions over the link (that is, with and against the direction of the video data). In some implementations, a channel is employed to transmit one stream of auxiliary data. In other implementations, a channel is employed to transmit more than one stream of auxiliary data. In some embodiments of the invention, two (or more than two) streams of serial video data are transmitted (over one, two, or more than two channels), and either one, two, or more than two streams of serial auxiliary data are also transmitted.

U.S. Pat. No. 5,999,571, issued Dec. 7, 1999, teaches (e.g., at col. 5) that, when the code words (indicative of video data) transmitted over a TMDS link are transition minimized words (a first subset of a set of code words), synchronization words (distinguishable from the transition minimized code words) can be transmitted over the link during "preamble" periods in which encoded video data are not transmitted. The synchronization words can be transition maximized words that are members of a second subset (disjoint from the first subset) of the set of code words. U.S. Pat. No. 5,999,571 teaches that several (e.g., three) repetitions of a synchronization word should be transmitted consecutively, to allow the decoder (in the receiver) rapidly and accurately to identify a specific transition (e.g., the leading edge) of one of the synchronization words and thus to accomplish synchronization with the encoder (in the transmitter).

U.S. Pat. No. 6,151,334, issued Nov. 21, 2000, teaches transmission (over a TMDS link) of several different types of encoded control words, each distinguishable from transition minimized code words indicative of data. At least some of the control words can be transition maximized words. One of the control words is a "data stream separation" word that is transmitted before or after a burst of data and is indicative of the start or end of a burst and the type of data transmitted during the burst. Another one of the control words is an "isochronous data transfer" word that is a synchronization character typically transmitted at the beginning or end of a blanking interval and indicates the type of the blanking interval (e.g., horizontal or vertical) and distinguishes between the beginning and the end of the blanking interval. For example, a first isochronous data transfer word indicates the start of a vertical blanking interval, a first data stream separation word then indicates the start of data in the vertical blanking interval, a second data stream separation word then indicates the end of such data burst, and a second isochronous data transfer word then indicates the end of the vertical blanking interval. Each of the first isochronous data transfer word, the first data stream separation word, the second data stream separation word, and the second isochronous data transfer word is a transition maximized code word, a transition minimized code word can indicate each word of data of the data burst (transmitted in the vertical blanking interval), and the vertical blanking interval can be followed by an active video period comprising a third data stream separation word (indicative of the start of a stream of video data) followed by a stream of transition minimized code words indicative of the video data itself.

SUMMARY OF THE INVENTION

In a class of embodiments, the invention is a communication system including a transmitter, a receiver, and a serial link (which can but need not be a TMDS or TMDS-like link), in which encoded data (e.g., encoded video data and optionally also encoded auxiliary data) are transmitted from the transmitter to the receiver. The serial link can but need not be a TMDS or TMDS-like link. In typical embodiments, alternating bursts of encoded video data and encoded auxiliary data are transmitted over each of one or more channels of the link. Other aspects of the invention are transmitters for use in encoding data for transmission over a serial link, and methods for sending encoded data over a serial link.

In accordance with the invention, the data to be transmitted are encoded using a subset (a "robust" subset) of a full set of code words. Typically, the code words in the full set have equal length (e.g., each consists of N bits). The robust subset will sometimes be referred to herein as a "selected" (or "inventive") set of code words, and the code words in the robust subset will sometimes referred to as the "inventive" code words. The robust subset is selected such that each stream of encoded data (comprising only inventive code words) transmitted over a serial link has a bit pattern that is less susceptible to inter-symbol interference ("ISI") during transmission than is the bit pattern determined by a transmitted, conventionally encoded version of the same data (comprising not only inventive code words but also members of the full set that are not inventive code words). Since the inventive code words are a subset of the full code word set and each inventive code word determines one source data word, the bit rate at which source data can be transmitted over the link is lower if the transmitted data are encoded using only the inventive code words than if the transmitted data are encoded conventionally using the full code word set. This is because, in general, a set of source data bits can be grouped into a fewer number of longer source data words (each different source data word to be encoded as a different L-bit code word) when more different L-bit code words are available for encoding the source data.

In general, the best choice for the particular inventive code word set selected from a full set of binary code words depends on the particular coding implemented by the full set (i.e., the details of which bits of each code word in the full set are zeroes and which are ones). In preferred embodiments, the inventive code words are selected to be those whose serial patterns (during transmission) have fewer contiguous zeros and ones (e.g., on the average), and thus are less susceptible to ISI during transmission, than do those code words in the full set that are not selected (e.g., the average number of contiguous zeros and ones, per code word, of the inventive code words is less than the average number of contiguous zeros and ones, per code word, of the code words in the full set that are not selected as the inventive code words). Also, when the bits of the inventive code words are transmitted over a serial link as sequences of rising and falling voltage transitions, the bit pattern of each transmitted stream of the inventive code words preferably implements DC balancing (the voltage drift over time is limited).

Typically, the full set comprises $2^N$ binary code words (each having a length of L bits) and thus can be efficiently used to encode data words of N-bit length for transmission. Also typically, the robust subset comprises $2^M$ of these code words (each having a length of L bits), where M<N, and thus can be efficiently used to encode data words of M-bit length for transmission. In this case, in order to encode N-bit source words using the inventive code words, the N-bit source words can be buffered and packed into M-bit format. Each resulting M-bit source word can then be encoded (as an L-bit encoded word) using one of the inventive code words. Assuming that the same time is required to transmit and decode each L-bit encoded word (regardless of whether the word is a member of the robust subset), fewer source data bits can be transmitted per unit time when the source words are encoded using the inventive code words than when the source words are conventionally encoded using the full code word set. For example, to encode 8-bit source data words, the full code word set can be the set of 10-bit code words employed in a conventional TMDS link (each such code word comprising one of 256, transition-minimized, 9-bit patterns whose most significant bit indicates that the pattern is transition-minimized, concatenated with a tenth bit indicating whether the eight least-significant bits have or have not been inverted in accordance with a DC balancing algorithm). In some embodiments, the robust subset consists of sixteen selected 10-bit code words of this full set, and the nine least-significant bits of each code word in the robust subset are indicative of a different one of the 256, transition-minimized, 9-bit patterns. Thus, to encode the 8-bit source words using only the sixteen inventive code words, each 8-bit source word is split into two 4-bit portions and each 4-bit portion separately encoded as one of the inventive 10-bit code words. Thus, the rate at which the 8-bit source data can be transmitted (after being encoded using only the inventive code words) is only half the rate at which the same data can be transmitted after being encoded conventionally using the full code word set. However, the conventionally encoded data would be subject to higher rates of error (e.g., error due to ISI) during transmission than would the same data if transmitted after being encoded using only the inventive code words.

In general, by reducing the ratio of M to N in the example (in which the robust subset comprises $2^M$ code words), lower bit-error rates (BER) can be achieved in accordance with the invention at the cost of reducing the rate at which the source data can be transmitted. Conversely, increasing the ratio of M to N results in an increased source data transmission rate at the cost of a higher BER.

Encoding of data in accordance with the invention is particularly beneficial in applications in which encoded data are to be transmitted over very long conductors or under other conditions in which there would otherwise be a high risk of error due to ISI during transmission.

In some embodiments of the invention, encoded data are transmitted in bursts over the serial link, and at least one of the inventive code words is used as a "guard band" word that is transmitted at the start or end (or the start and end) of a burst of encoded data (to identify the leading and/or trailing edge of the burst) or at the start or end (or at the start and end) of each burst of encoded data of a specific type. In some such embodiments, two different guard band words are used: one for transmission at the start of each encoded data burst (to identify the leading edge of the burst); the other for transmission at the end of each encoded data burst (to identify the trailing edge of the burst). In preferred embodiments, bursts of at least two different types of encoded data (e.g., audio data or other auxiliary data, and video data) are transmitted over the serial link and P different ones (where P is greater than or equal to 2) of the inventive code words are used as P different guard band words, including: one guard band word for transmission at the start of each burst of encoded data of a first type (to identify the leading edge of such burst); and another guard band word for transmission at the start of each burst of encoded data of a second type (to identify the leading edge of such burst). For example, in some embodiments bursts of encoded video data (each identified by a first guard band word) are transmitted during active video periods, and bursts of auxiliary data (each identified by a second guard band word) are transmitted during blanking intervals between the active video periods.

In a class of systems that embody the invention, 8-bit video data words (each encoded according to the TMDS encoding algorithm as a 10-bit code word) are transmitted over a TMDS link (or other TMDS-like link having multiple channels for transmitting serial video) during active video periods in which a control signal (DE) is high, and control words (each indicative of two bits: CTL0 and CTL1, or CTL2 and CTL3) or synchronization words (each indicative of two bits: HSYNC and VSYNC) are transmitted over each of at least some of the video transmission channels during blanking intervals (in which DE is low) between the active video periods. The system is operable in a mode in which each transmitted video data word is conventionally encoded as a transition-minimized, 10-bit TMDS code word. Each such transition-minimized code word determines one of 256 different nine-bit patterns, having a most significant bit indicating that the pattern is transition-minimized, concatenated with a tenth bit indicating whether the eight least-significant bits of the nine-bit pattern have or have not been inverted in accordance with a DC balancing algorithm. Each transmitted control word (CTL1:CTL0 or CTL3:CTL2) and synchronization word (HSYNC:VSYNC) is a distinctive, 10-bit, transition-maximized word. In preferred embodiments, 4-bit words of auxiliary data (encoded in accordance with the invention) are transmitted during the blanking intervals at times when no control words or synchronization words are transmitted. The auxiliary data are typically but not necessarily audio data. In other embodiments, the system is operable in a mode in which 4-bit words of video data (encoded in accordance with the invention) are transmitted during the active video periods. To provide at least one guard band word, and for use in encoding auxiliary data in accordance with the invention for transmission in blanking intervals between active video periods, a robust subset of 17 different, transition-minimized code words is selected from the full conventional TMDS code space: sixteen 10-bit code words (each indicative of a different 4-bit auxiliary data word, and one of which is optionally also used as a guard band word at the start and end of each burst of encoded auxiliary data); and one 10-bit code word used as a guard band word (at the start and end of each active video period). Alternatively, a robust subset of 18 different, transition-minimized code words is selected from the full conventional TMDS code space: sixteen 10-bit code words (each indicative of a different 4-bit source word); and two 10-bit code words (each used as a guard band word).

In some embodiments of the invention, bursts of encoded auxiliary data and bursts of encoded video data are transmitted over a serial link, and the auxiliary data are encoded in accordance with the invention using a set of inventive code words. The set of inventive code words includes a "video" guard band word that is transmitted at the start of each encoded video data burst, and an "auxiliary" guard band word that is transmitted at the start of each encoded auxiliary data burst. In some implementations, at least one of the guard band words is also used for a second purpose: to encode auxiliary data. In preferred implementations of such embodiments, the encoded video data are transmitted during active video periods in which a control signal, DE, is high (DE=1), and encoded control (or synchronization) signals and encoded auxiliary data are transmitted during blanking intervals (in which DE=0) between active video periods. At least one video guard band word is transmitted at the start of each active video period. Each blanking interval comprises at least one auxiliary data period (each comprising at least one auxiliary guard band word followed by a burst of encoded auxiliary data), a preamble period (or "front porch") between the falling edge of DE (at the start of the blanking interval) and the start of the first (or only) auxiliary data period (and optionally also an additional front porch before each subsequent auxiliary data period in the blanking interval), and a final period (a "back porch") between the last auxiliary data period and the next active video period. Control (or sync) signals of a specific type are transmitted during each front porch. Control signals of another specific type are transmitted in the back porch.

BRIEF DESCRIPTION OF THE DRAWINGS

FIG. 3 is a table showing data patterns transmitted in "front porch" and "back porch" portions of a blanking interval, and the inventive guard band code words transmitted after such front porch and back porch portions, in a preferred embodiment of the invention.

DETAILED DESCRIPTION OF THE PREFERRED EMBODIMENTS

Figure 1:
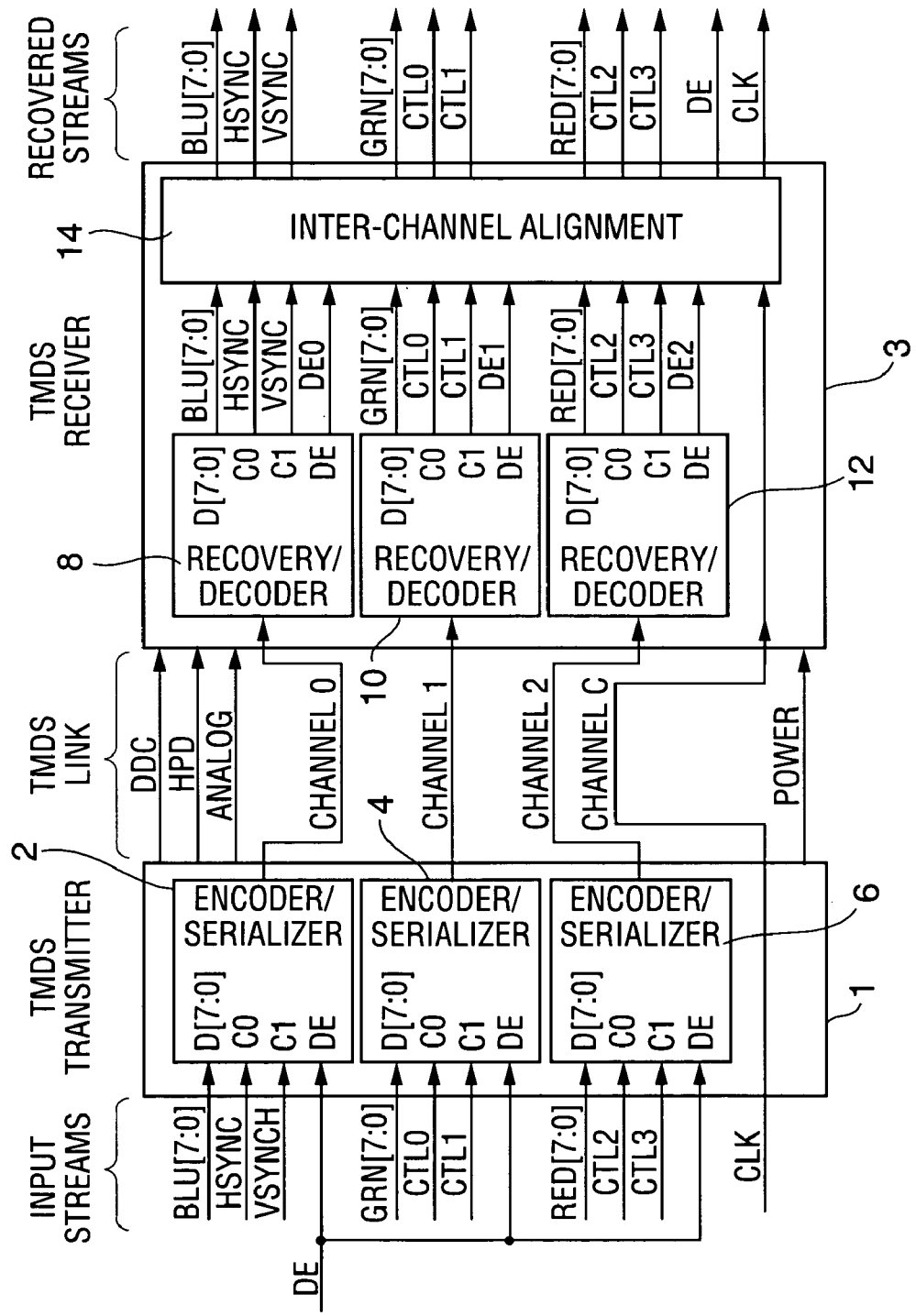
FIG. 1 is a block diagram of a conventional system including a Digital Visual Interface ("DVI") link.

During transmission of data over a serial link from a transmitter to a receiver, inter-symbol interference ("ISI") can give rise to errors that cause the received data to differ from the transmitted data. The rate at which such errors occur depends on such factors as the channel medium, and when the data are patterns of binary bits, the particular bit patterns that are transmitted. In accordance with the invention, data are encoded for transmission over a serial link with bit patterns that are less susceptible to ISI during transmission over the link than are the patterns determined by conventionally encoded versions of the same data. Thus, the data are transmitted more reliably in accordance with the invention, and with reduced error rate, than are conventionally encoded versions of the same data. More specifically, data are encoded in accordance with the invention using a subset (a "robust" subset) of a full set of code words. Typically, the code words in the full set have equal length (e.g., each consists of N bits). The robust subset will sometimes be referred to herein as a "selected" or "inventive" set of code words, and the code words in the robust subset will sometimes referred to as the "inventive" code words. The robust subset is selected such that each transmitted stream of encoded data (coded using only members of the inventive code word set) has patterns that are less susceptible to ISI during transmission over the serial link than are patterns determined by a transmitted, conventionally encoded version of the same data (that has been coded using code words of the full set other than members of the inventive code word set, as well as members of the inventive code word set). Since there are more code words in the full set than there are inventive code words, fewer words of data can be transmitted over the link per unit time if the transmitted data are encoded using only the inventive code words than if the transmitted data are encoded conventionally using the full set of code words.

Encoding of data in accordance with the invention is particularly beneficial in applications in which the encoded data are transmitted over very long conductors or under other conditions in which there would otherwise be a high risk of error due to ISI during transmission.

It should be appreciated that the term "transmitter" is used herein in a broad sense to denote any unit capable of encoding data and transmitting the encoded data over a serial link (and optionally also encrypting the data to be transmitted), and the term "receiver" is used herein in a broad sense to denote any unit capable of receiving data and decoding that has been transmitted over a serial link (and optionally also decrypting the received data). For example, the term transmitter can denote a transceiver that performs the functions of a receiver as well as the functions of a transmitter. In a more specific example, the term transmitter (with reference to a unit that transmits non-audio auxiliary data over a TMDS-like link or other serial link) can denote a transceiver that is configured to receive video data and audio data over the link and to transmit the non-audio auxiliary data over the link.

As noted above, the term "stream" of data (as used herein) denotes that all the data are of the same type and are transmitted with the same clock frequency, and the term "channel" (as used herein) refers to that portion of a serial link that is employed to transmit data (e.g., a particular conductor or conductor pair between the transmitter and receiver over which the data are transmitted, and specific circuitry within the transmitter and/or receiver used for transmitting and/or recovery of the data) and to the technique employed to transmit the data over the link.

When transmitting audio (or other auxiliary) data via a serial link, is it often desired to transmit multiple streams of the auxiliary data, and it is often valuable for multiple channels of the link to be available for transmission of the auxiliary data. For example, there can be two audio streams (left and right streams of stereo audio), six streams (e.g., those of "5.1" surround sound), or up to eight streams (e.g., those of "7.1" surround sound). Alternatively, it may be desired to transmit even more streams of audio data with video, or to transmit streams of non-audio auxiliary data (for providing non-audio effects that are synchronized to the video) with audio and video. All such streams of auxiliary data are typically on the same time base, but alternatively there can be a need for some of the audio (or other auxiliary) data to be based upon another time base, or to have a different sampling rate. For example transmission of six streams of pulse code modulated (PCM) audio data over the link can be based upon one clock. Another two streams of compressed audio data, possibly a down-mix (for playback on a reduced number of speakers), might be transmitted with the video and PCM data as well.

In high-speed serial digital data transmission the data are often encoded to maximize or minimize the number of transitions and to also balance the DC level. For example, in systems including at least one of the above-referenced TMDS links, transition-minimized, DC-balanced, TMDS encoded video data are transmitted over each of three channels of at least one TMDS link, and encoded auxiliary data (e.g., audio data) can be transmitted over one or more of these three channels during blanking intervals between the active video periods. When the bandwidth requirement of the auxiliary data is lower than that of the primary data (video data) and the auxiliary data channel has significant ISI (which can result from a long cable), then the auxiliary data are desirably encoded using the inventive encoding scheme to achieve a lower bit-error rate during transmission.

In a class of preferred embodiments, auxiliary data are encoded in accordance with the invention (for transmission over a TMDS link) using a subset of the transition-minimized TMDS code words that are conventionally used to encode video data for transmission over the link. These and/or other embodiments of the invention can be implemented by a system of a type to be described with reference to FIG. 2. The FIG. 2 system is identical to that of FIG. 1, except in that it is configured to encode auxiliary data (or other auxiliary data) in accordance with the invention (and also to encode video data in the same conventional manner as in the FIG. 1 system), transmit the encoded data over one or more of Channel 0, Channel 1, and Channel 2 (and also to transmit encoded video data over each such channel), and decode the encoded auxiliary data (as well as the encoded video data). Transmitter 1' and receiver 2' of FIG. 2 correspond, respectively, to transmitter 1 and receiver 3 of FIG. 1 (but perform auxiliary data encoding, transmission, and decoding functions that are not performed by transmitter 1 and receiver 3 of FIG. 1). The TMDS link between transmitters 1' and 2' in FIG. 2 is identical to the TMDS link between transmitters 1 and 3 in FIG. 1, although some of the conductors thereof are shown in FIG. 1 but not in FIG. 2 (for simplicity).

Figures 2, 4:
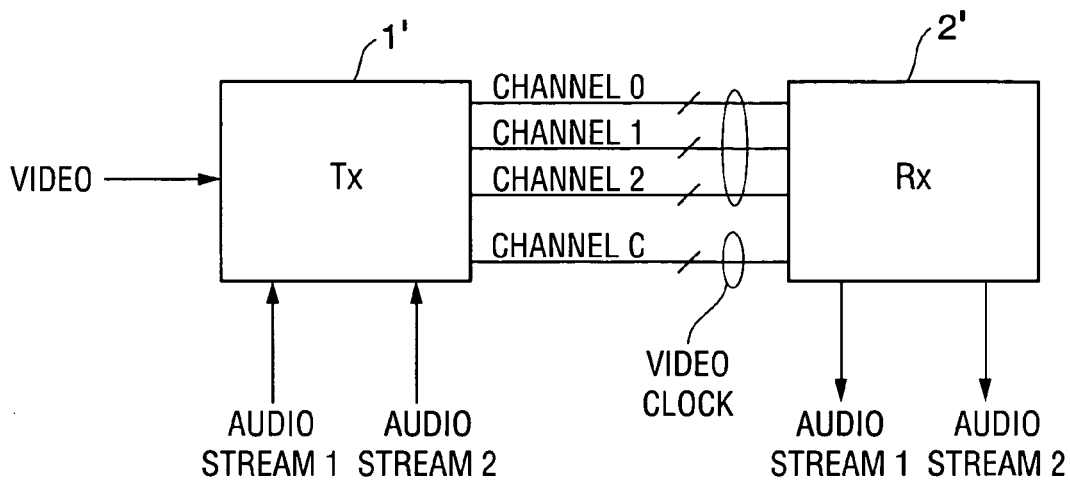
FIG. 2 is a block diagram of a first embodiment of the inventive system.
FIG. 4 is a table showing a set of seventeen of the inventive code words (including one guard band word) employed in a preferred embodiment of the invention.

The FIG. 2 system preferably transmits a video clock over a conductor pair (labeled "Channel C in FIG. 2) of the TMDS link, and also transmits a clock for the auxiliary data over at least one channel of the link. For example, transmitter 1' transmits video data to receiver 2' over Channels 0, 1, and 2 (which are identical to the identically numbered channels of the FIG. 1 system) except during video blanking intervals, transmits two streams of audio data (e.g., left and right stereo signals) over any two of Channels 0, 1, and 2 to receiver 2' during the video blanking intervals, continuously transmits a video clock (e.g., determined by the rising edges of a binary waveform) over Channel C, and transmits time stamp data with each burst of the audio data. The time stamp data determine a clock for the audio data, as described in above-cited U.S. patent application Ser. No. 09/954,663, filed on Sep. 12, 2001. Receiver 2' is configured to process the time stamp data to recover the audio clock employed to transmit the audio data.

Typically the clock for a stream of audio data has a much lower frequency than the pixel clock for a stream of video. However, in most applications the audio clock needs to be more accurate than the pixel clock, to reduce jitter. This is true since distortion in analog audio (that has been generated from digital audio data having jitter) is more easily discernible (to one experiencing the analog audio) than is the distortion in a displayed video program generated from digital video having the same amount of jitter.

In the FIG. 2 system, 8-bit source words of video data are encoded into 10-bit code words which are then serialized and transmitted over a channel medium (one of the conductor pairs identified as Channels 0, 1, and 2). In receiver 2', each 10-bit code word is decoded back to the original 8-bit word if no errors are present. Each code word comprises a 9-bit base pattern (a transition-minimized member of a set of $2^9$ nine-bit patterns, whose most significant bit indicates that the base pattern is transition-minimized, concatenated with a tenth bit indicating whether the eight least-significant bits of the base pattern have or have not been inverted in accordance with a DC balancing algorithm). In transmitter 1', each 8-bit source word is first encoded to one of the 9-bit base patterns, and a stream of the 9-bit base patterns are then encoded as a stream of the 10-bit code words (in a manner that achieves improved DC balancing of the transmitted stream of 10-bit code words). However, the decoded video data can include errors (especially when the relevant channel has significant ISI), depending on the specific channel media and the specific data patterns of the transmitted serial bit stream.

If transmitter 1' and receiver 2' were operated to encode and decode the auxiliary data in the same way that they encode and decode the video data, and to send both types of encoded data over the same channel of the serial link, the decoded auxiliary data would be subject to error at the same error rate. This error rate can be unacceptably high for auxiliary data (especially when the auxiliary data are audio data), even if it is acceptable for video data. To reduce the error rate for the auxiliary data, transmitter 1' can be configured to encode the auxiliary data in accordance with the invention. Optionally, transmitter 1' can be configured also to encode the video data in accordance with the invention (or to be operable in a mode in which it encodes both the video data and auxiliary data in accordance with the invention). However, since data encoded in accordance with the invention (with a robust subset of a "full set" of code words) necessarily has a lower data transmission rate than the same data encoded in a conventional manner (using the same "full set" of code words, assuming that both streams of encoded bits are transmitted with the same clock frequency). In many applications, video data cannot practically be transmitted at an adequate rate if encoded in accordance with the invention. Thus, typical implementations of the FIG. 2 system will encode auxiliary data (but not video data) in accordance with the invention.

In a class of embodiments, transmitter 1' is configured to encode the auxiliary data in accordance with the invention as follows. A subset of the full set of 10-bit TMDS code words is selected as the "inventive" code word set such that each transmitted stream of 10-bit words of encoded auxiliary data (consisting only of the inventive code words) has a pattern that is less susceptible to inter-symbol interference than is the pattern determined by a transmitted stream of a TMDS-encoded version of the same data (including not only inventive code words but also members of the full set that are not inventive code words).

In some embodiments, a $2^M$-bit subset (where M<8) of the full set of 10-bit TMDS code words is selected to be the inventive code word set. Optionally, the inventive code word set also includes one or more code words of the full set that are used as guard band words. The 17 inventive code words (each comprising 10 bits) to be described below with reference to FIGS. 3 and 4 are an example of such a $2^M$-bit subset (where M=4) supplemented by one additional guard band word. Receiver 2' is implemented to decode each received one of the inventive 10-bit code words as an auxiliary data word of length M bits. Receiver 2' performs the same decoding operations on the encoded auxiliary words received during blanking intervals that it performs on the conventionally encoded video words received during the active video periods. However, during the encoding of source auxiliary data (using the inventive code words), transmitter 1' does not perform the conventional DC balancing steps that it performs during its conventional encoding of source video data (in which the eight least significant bits of the "N+1"th encoded video word are inverted, and the resulting nine bits are concatenated with a distinctive tenth, most significant bit when the cumulative DC drift of the N previous encoded video words reaches a predetermined threshold, and otherwise does not invert the eight least significant bits of the "N+1"th encoded video word and instead concatenates the word with another distinctive, tenth, most significant bit). Rather, transmitter 1' is configured simply to replace each 4-bit source word of auxiliary data with the corresponding one of the inventive code words, regardless of the cumulative DC drift of the resulting stream of inventive code words (and regardless of whether the MSB of the inventive code word is a one or zero). The inventive code words are preferably chosen so that when the bits of a stream of the inventive code words are transmitted over a serial link as sequence of rising and falling voltage transitions, the bit pattern of such stream of the inventive code words is DC balanced (or is likely to be DC balanced) in the sense that the voltage drift that it determines over time is limited to an acceptable amount.

In other embodiments, transmitter 1' does perform the same DC balancing steps during its encoding of source auxiliary data (using the inventive code words) and during its conventional encoding of source video data. This is taken into consideration in the selection of the inventive code word set. Specifically, each code word of the inventive code word set has a 9-bit base pattern that is a member of a selected subset of the 9-bit base pattern space of the full set of 10-bit TMDS code words, and during encoding of 4-bit words of source auxiliary data (to replace them with the inventive 10-bit code words), the eight least-significant bits of this 9-bit base pattern are either inverted and the resulting pattern concatenated with a tenth (and most significant) bit having a first value, or the base pattern is not inverted and is instead concatenated with a tenth (and most significant) bit having a second value, depending on whether the cumulative DC drift of the stream of previously encoded auxiliary words has reached a predetermined threshold. In these embodiments, receiver 2' is implemented to perform the same decoding operations on the encoded auxiliary data words received during blanking intervals that it performs on the conventionally encoded video data words received during the active video periods, and then to map each 8-bit word (generated as a result of conventional decoding of one of the 10-bit encoded auxiliary data words) to one of the $2^M$ auxiliary data words each having M-bit length.

In the described embodiments of the FIG. 2 system, the size of the auxiliary data encoding space (the number of different auxiliary data words that can be encoded with the inventive code word set) is reduced from $2^8$ (=256) to $2^M$ (where M<8) in accordance with the invention, and thus the effective rate at which the auxiliary data (encoded in accordance with the invention) can be transmitted is reduced from 8 bits per clock period per channel to M bits per clock period per channel. By reducing the value M (i.e., selecting a smaller inventive set of code words from the full set), a lower bit-error rate (BER) can be achieved but the data rate will also be reduced. Conversely, increasing the parameter M results in an increased data rate but at the cost of increased BER.

We next describe an embodiment of the inventive code word set with reference to FIGS. 3 and 4. This code word set is a subset of the full set of conventional TMDS 10-bit code words, and is useful for encoding 4-bit words of auxiliary data for transmission over a TMDS (or TMDS-like) link over which 8-bit video words (conventionally encoded using the full set of TMDS 10-bit code words) are also transmitted, in cases when it is adequate to transmit the auxiliary data at half the data rate as the video data. Typically, 8-bit input words of binary auxiliary data are buffered, the four least-significant bits of each are encoded (e.g., in transmitter 1' of FIG. 2) as one of the sixteen 8-bit words "AD0-AD15" in the left column (labeled "Input D7-D0") of FIG. 4, and the four most significant bits of each 8-bit input word are also encoded as the appropriate one of the sixteen 8-bit words AD0-AD15. Each of the words AD0-AD15 has the hexadecimal representation shown in the center column of FIG. 4. Each of the words AD0-AD15 is then encoded (e.g., in transmitter 1') as the corresponding one of the 10-bit patterns shown in the right column of FIG. 4.

In FIG. 4 (and FIG. 3), the left bit of each code word is the LSB and (in the case of each 10-bit code word) is the first bit to be transmitted over the serial link. Also, the right bit of each code word is the MSB and (in the case of each 10-bit code word) is the last bit to be transmitted over the serial link.

For example, an input auxiliary data word 10000000 (whose LSB is 1) would be split into two halves (1000 and 0000) and the two halves then encoded as AD1 and AD0, respectively. Then, the 8-bit word AD0 is encoded as the 10-bit inventive word "0011100101" and the 8-bit word AD1 is encoded as the 10-bit inventive word "0110001101." The two inventive words would then be serialized transmitted over the serial link sequentially, with the bits "0011100101" indicative of the "most significant" half (0000) of the input word being transmitted before the bits "0110001101" that are indicative of the least significant half (1000) of the input word. At the receiver, each 10-bit inventive word is decoded into one of the 8-bit words AD0-AD15, and the original 8-bit input auxiliary data words can be reconstructed from the recovered words AD0-AD15 since there is a one-to-one mapping between each word AD0-AD15 and one half (four bits) of each 8-bit input auxiliary data word.

Of course, the input auxiliary data asserted to the transmitter (e.g., transmitter 1') can be 4-bit words, in which case the transmitter would not need to split (or otherwise pack) received input auxiliary data words into 4-bit format before encoding them as a sequence of the words AD0-AD15. Alternatively, the input auxiliary data can be pre-encoded as a sequence of 8-bit words AD0-AD15, and the pre-encoded auxiliary data then provided to the transmitter in the form of a sequence of the 8-bit words AD0-AD15.

Figure 5:
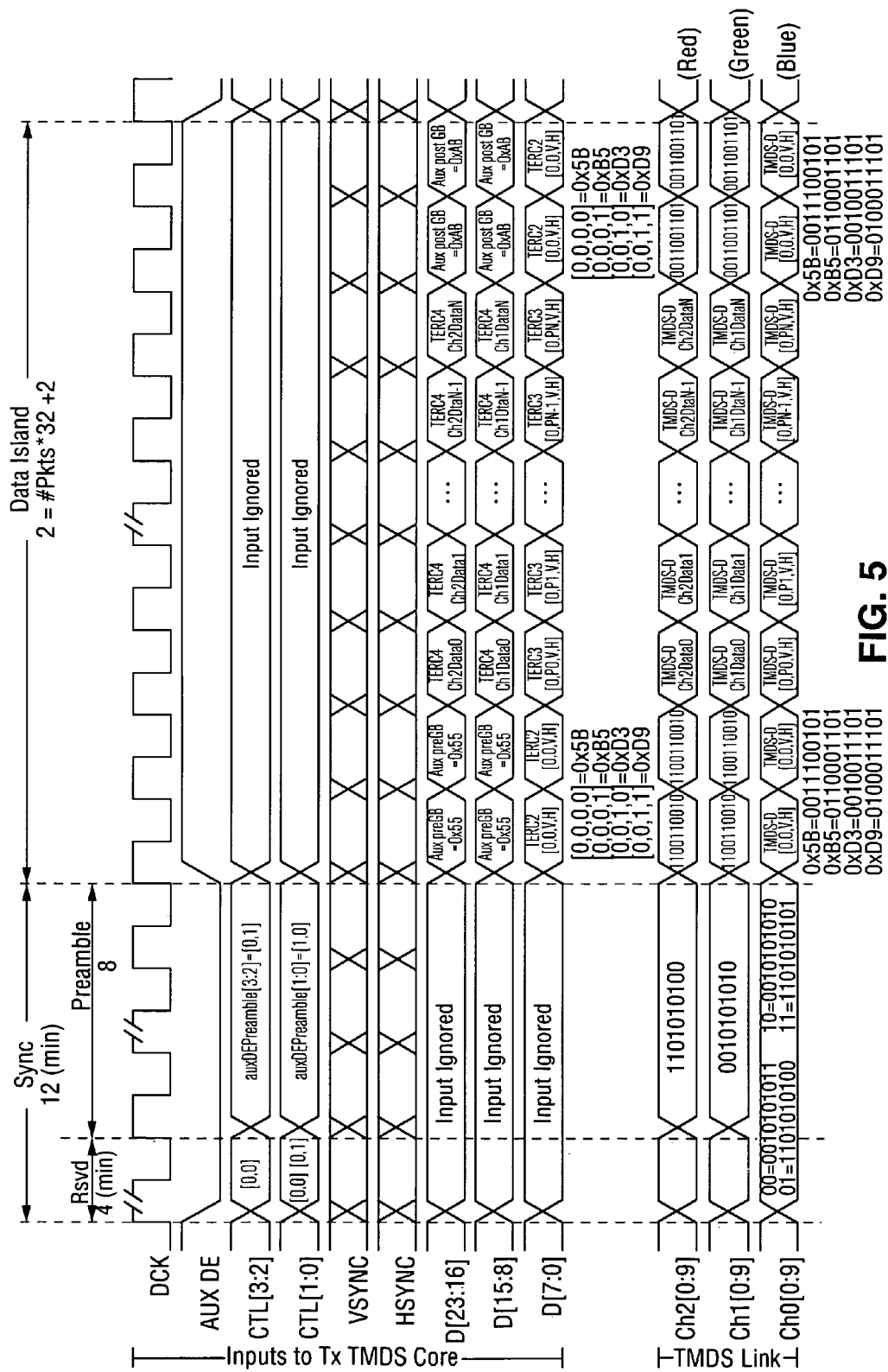
FIG. 5 is a timing diagram of signals input to the transmitter during a video blanking interval of an embodiment of the inventive system, and encoded signals transmitted over a TMDS link of such system in response thereto.
Figure 6:
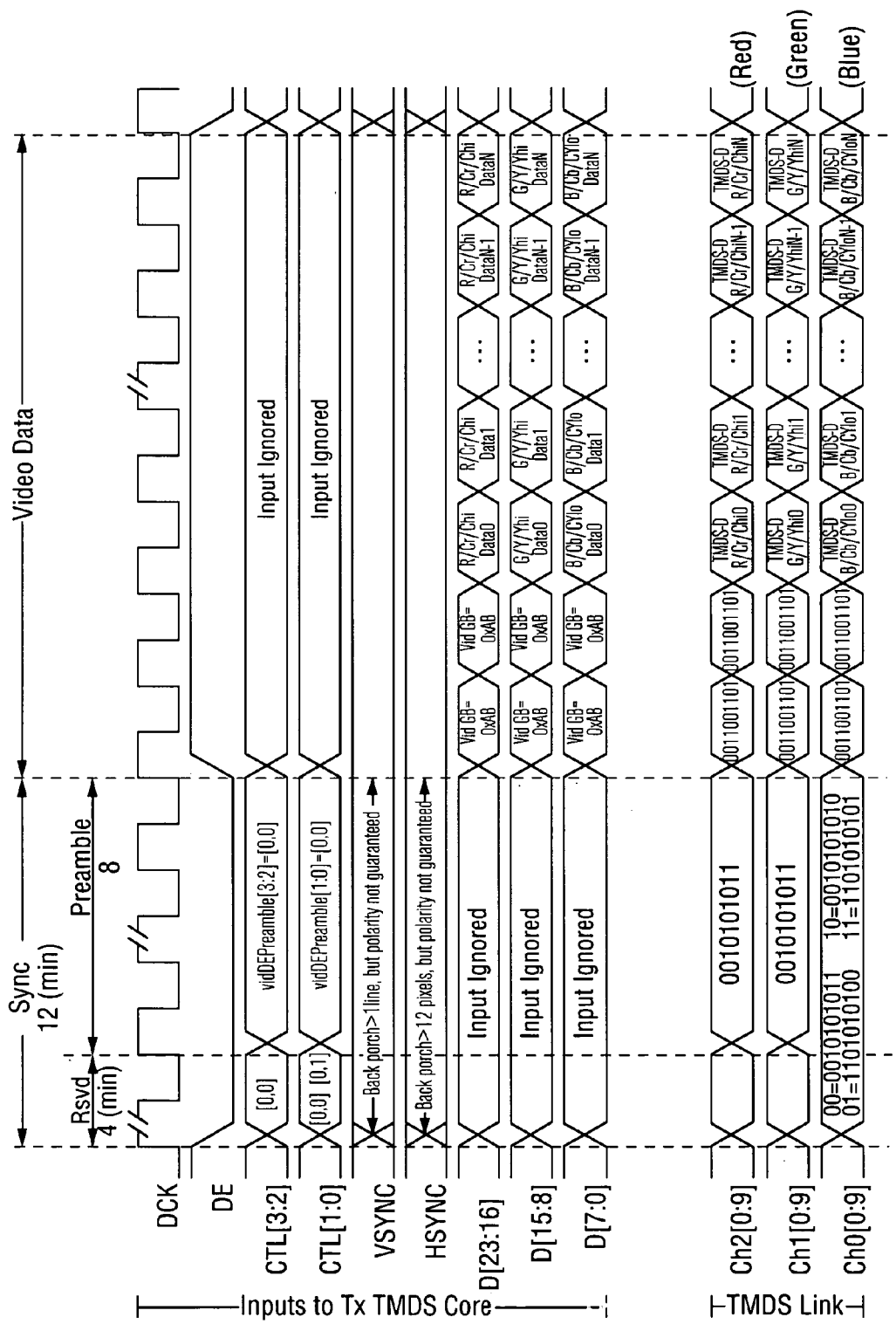
FIG. 6 is a timing diagram of signals input to the transmitter during the back porch portion of a video blanking interval (and during a subsequent active video period) of an embodiment of the inventive system, and encoded signals transmitted over a TMDS link of such system in response thereto.

Typically, the encoded auxiliary data are transmitted in the same channels (CH0, CH1, and CH2) of a TMDS link in which video data are transmitted, but the auxiliary data are transmitted during the blanking intervals (in which DE=0) between the active video periods (in which DE=1) of video data transmission. FIGS. 5 and 6 are timing diagrams of signals transmitted during such an embodiment of the invention. The upper nine signals of FIG. 5 represent signals input to the transmitter during a blanking interval, and the lower three signals of FIG. 5 represent the auxiliary data (encoded using the 10-bit words of FIG. 4) and encoded control and sync signals (to be discussed below) that are transmitted over channels CH0, CH1, and CH2 during the blanking interval in response to the upper nine signals. Similarly, the upper nine signals of FIG. 6 represent signals input to the transmitter at the end of the blanking interval (of FIG. 5) and during the active video period that follows such blanking interval, and the lower three signals of FIG. 6 represent the auxiliary data (encoded using the 10-bit words of FIG. 4), video data (conventionally encoded), and encoded control and sync signals (to be discussed below) that are transmitted over channels CH0, CH1, and CH2 in response to the upper nine signals.

In FIGS. 5 and 6:

24-bit words of input data are provided to the encoding circuitry of the transmitter for encoding. FIG. 5 pertains to those of such words (each identified as D[23:0] in FIG. 5) that are words of auxiliary data. FIG. 6 pertains to those of such words (each identified as D[23:0] in FIG. 6) that are words of video data. Eight bits of each input word (D[23:16]) are encoded, serialized, and transmitted on channel CH2 (as 10-bit encoded words CH2[0:9]), another eight bits of each such word (D[15:8]) are encoded, serialized, and transmitted on channel CH1 (as 10-bit encoded words CH1[0:9]) and another eight bits of each such word (D[7:0]) are encoded, serialized, and transmitted on channel CH0 (as 10-bit encoded words CH0[0:9]). In some implementations, the video data are in RGB format (and the red, green, and blue pixels are transmitted on channels CH2, CH1, and CH0, respectively). In view of this, channels CH2, CH1, and CH0, are sometimes referred to herein (such as in FIG. 3) as the red (or "R") channel, the green (or "G") channel, and the blue (or "B") channel, respectively. Alternatively, the video data that are encoded (and then transmitted) are in luminance-chrominance format;

the waveform "DCK" indicates the data clock. During each cycle of the data clock, the ten bits of each one of the inventive code words indicative of auxiliary data (or a guard band), or each of the conventional TMDS 10-bit code words indicative of video data, are sequentially transmitted over the relevant one of channels CH0, CH1, and CH2. In an actual implementation, a clock having ten times the frequency of DCK (but in phase with DCK) would be used to clock the encoding, transmission, and decoding operations, and one code bit would be transmitted during each cycle of this faster clock;

the waveform "DE" (of FIG. 6) is the video data enable signal, and the waveform "AUX DE" (of FIG. 5) is the auxiliary data enable signal. When DE=1 and AUX DE=0, video data (identified as D[23:16], D[15:8], and D[7:0] in FIG. 6) are encoded, and serialized 10-bit words of the encoded video are transmitted over channels CH0, CH1, and CH2. When DE=0 and AUX DE=1, auxiliary data (identified as D[23:16], D[15:8], and D[7:0] in FIG. 5) are encoded, and serialized 10-bit words of the encoded auxiliary data are transmitted over channels CH0, CH1, and CH2. When DE=0 and AUX DE=0, the transmitter ignores signals asserted to its data inputs and instead encodes (as 10-bit TMDS code words) control bit pairs asserted to its control inputs (bits CTL3 and CTL2, indicated as "CTL[3:2]" in FIGS. 5 and 6, and bits CTL1 and CTL0, indicated as "CTL[1:0]" in FIGS. 5 and 6), serializes these code words, and transmits the serialized code words over channels CH1 and CH2, and encodes (as 10-bit transition-maximized words) sync bit pairs (HSYNC and VSYNC) asserted to its sync inputs, serializes these code words, and transmits the serialized code words over channel CH0.

More specifically, each blanking interval (each interval in which DE=0) has at least three portions: an initial portion (a "front porch") followed by an auxiliary data portion followed by a final portion (a "back porch"). Optionally, there are two or more auxiliary data periods in a blanking interval (each comprising at least one auxiliary guard band word followed by a burst of a different channel of encoded auxiliary data), a front porch between the falling edge of DE (at the start of the blanking interval) and the start of the first auxiliary data portion, an additional front porch before each subsequent auxiliary data period in the blanking interval, and a back porch between the last auxiliary data period and the next active video period. During each front porch, repetitions of code words indicative of specific patterns of control bits CTL3, CTL2, CTL1, and CTL0, repetitions of code words indicative of any pattern of sync bits HSYNC and VSYNC, and optionally also initial bit patterns (e.g., patterns in the time interval labeled "Rsvd" in FIG. 5 at the start of the front porch of channels CH2 and CH1) are transmitted. During the back porch, repetitions of code words indicative of other specific patterns of control bits CTL3, CTL2, CTL1, and CTL0, repetitions of code words indicative of any pattern of sync bits HSYNC and VSYNC, and optionally also initial bit patterns (e.g., patterns in the time interval labeled "Rsvd" in FIG. 6 at the start of the back porch of channels CH2 and CH1) are transmitted. During the auxiliary data portion, the inventive code words (indicative of encoded auxiliary data) and guard band words are transmitted.

More specifically, the following signals are transmitted during the back porch (as indicated in FIGS. 3 and 6): repetitions of a code word, "0010101011" indicative of CTL3=0, CTL2=0 are transmitted on CH2 (preferably after an initial bit pattern in the "Rsvd" interval), repetitions of the same code word, "0010101011" indicative of CTL1=0, CTL0=0 are transmitted on CH1 (preferably after an initial bit pattern), and repetitions of a code word indicative of one of the four possible combinations of sync bits HSYNC and VSYNC are transmitted on CH0. Normally, during the final 12 pixel clock cycles of the back porch (just before the 0-to-1 transition of DE as shown in FIG. 6), both sync bits HSYNC and VSYNC have the value 0, so that the code word indicative of HSYNC=0, VSYNC=0 (namely the code word "0010101011" shown at the bottom of FIG. 6) is transmitted over the channel CH0.

The following signals are transmitted during the front porch (as indicated in FIGS. 3 and 5): repetitions of a code word, "1101010100" indicative of CTL3=0, CTL2=1 are transmitted on CH2 (preferably after an initial bit pattern in the "Rsvd" interval), repetitions of the code word, "0010101010" indicative of CTL1=1, CTL0=0 are transmitted on CH1 preferably after an initial bit pattern), and repetitions of a code word indicative of one of the four possible combinations of sync bits HSYNC and VSYNC are transmitted on CH0. Typically, during a "VSYNC" period of the front porch (the VSYNC window of FIG. 3), code words of specific values of CTL3, CTL2, CTL1, CTL0, VSYNC, and HSYNC (as shown in FIG. 3) are transmitted on channels CH2, CH1, and CH0.

Although FIGS. 5 and 6 have been described with reference to two data enable signals, "DE" and "AUX DE," it is contemplated that the transmitter can be implemented with a portion (a "core") configured to perform all the described encoding, serialization, and transmission in response to a single data enable signal (e.g., a combined enable signal indicative of the result of performing a logical "OR" operation on the signals DE and AUX DE), and a single set of data inputs (D[23:0]) indicative of either video or auxiliary data. Additional circuitry of the transmitter outside the core is configured to receive separate sets of auxiliary data (e.g., 24-bit auxiliary data words) and video data (e.g., 24-bit video data words), and both a video data enable signal DE, and an auxiliary data enable signal "AUX DE." The signals DE and AUX DE occur in the repeating sequence (DE=0, AUX DE=0), (DE=1, AUX DE=0), (DE=0, AUX DE=0), and (DE=0, AUX DE=1), and the additional circuitry includes logic circuitry that "ORs" together the signals DE and AUX DE to produce a combined data enable signal. The additional circuitry also packs the auxiliary data into 4-bit format, encodes each 4-bit portion of the auxiliary data as one of the words AD0-AD15 shown in FIG. 4, adds guard band words with appropriate timing into the stream of AD0-AD15 auxiliary data words, and replaces (with appropriate timing) words of the video data with video guard band words. The additional circuitry asserts alternating bursts of the video data (with video guard band words) and auxiliary data (with guard band words) to the core, and also asserts the combined data enable signal to the core. The core performs all the encoding, serialization, and transmission operations described with reference to FIGS. 5 and 6 in response to the combined data enable signal (rather than separate DE and AUX DE signals) and the alternating bursts of video and auxiliary data.

In each of at least one channel of a serial link (e.g., in each of channels CH2 and CH1 in the case of data transmission in accordance with the invention over a TMDS link), an appropriate one of the inventive code words is (or two or more appropriate ones of the inventive guard band words are) preferably transmitted (as a guard band word or set of guard band words) at the start of each burst of encoded auxiliary data (i.e., immediately after each "front porch" of each blanking interval), at the end of each burst of encoded auxiliary data (i.e., immediately before each "back porch" of each blanking interval), and at the start of each burst of encoded video data (i.e., immediately after each "back porch" of each blanking interval).

Each guard band word should have a bit pattern which allows the receiver to more reliably identify the relevant transition (indicated by the guard band word or words) between encoded control (or sync) word transmission and encoded data transmission. Thus, an additional factor in the selection of the inventive code word set is that it preferably includes appropriate guard band words. For example, the set of 17 inventive code words shown in FIG. 4 includes a special auxiliary guard band word (having bit pattern "1100110010," and shown in FIG. 4 as the uppermost one of the 17 code words shown) that is used to identify the start of an auxiliary data burst. As shown in FIG. 5, two repetitions of this "pre-data" auxiliary guard band word are preferably transmitted at the start of each burst of encoded auxiliary data (i.e., just after each front porch) in each of channels CH2 and CH1. Since the last bit of each specific encoded control word transmitted in channels CH2 and CH1 (during the front porch) is "0" as explained above, the first transmitted bit of the code word chosen as the pre-data auxiliary guard band word is "1" to increase the reliability with which the receiver can identify the start of a transmitted burst of auxiliary data.

The set of 17 inventive code words shown in FIG. 4 also includes a word (the word "0011001101" that corresponds to input word AD11) that is used to identify the end of an auxiliary data burst, and is also used as a video guard band word. As shown in FIG. 5, two repetitions of this "post-data" auxiliary guard band word are preferably transmitted at the end of each burst of encoded auxiliary data (i.e., just before each back porch) in each of channels CH2 and CH1.

The pre-data auxiliary guard band word need not be repeated (transmitted twice) at the start of each auxiliary data burst, and the post-data auxiliary guard band word need not be repeated at the end of each auxiliary data burst. In the preferred embodiment (indicated by FIG. 5), each is repeated in order to allow the receiver more easily to recognize and correct for data shift errors between channels that can occur during transmission and recovery of the data (e.g., error in the phase of the received data on channel CH1 relative to that of the data received on channel CH2). In other embodiments of the invention, an auxiliary guard band word is repeated more than twice (or is transmitted only once) at the start of each auxiliary data burst and/or more than twice (or is transmitted only once) at the end of each auxiliary data burst.

With reference to FIG. 4, the inventive code word "0011001101" (that corresponds to input word AD11) is used as a video guard band word to identify the start of a video data burst, in addition to being used as a code word for encoding the four-bit quantity of auxiliary data indicated by input word AD11, and as a post-data auxiliary guard band word. As shown in FIG. 6, two repetitions of this video guard band word are preferably transmitted at the start of each burst of encoded video data (i.e., just after each back porch). Since the last two bits of the encoded control or sync word transmitted in each of channels CH0, CH1, and CH2 (at the end of the back porch) are likely to be "11" as explained above, the first two transmitted bits of the video guard band word are chosen to be "00" to increase the reliability with which the receiver can identify the start of a transmitted burst of video data.

The video guard band word need not be repeated (transmitted twice) at the start of each video data burst. In the preferred embodiment shown in FIG. 6, it is repeated in order to ensure transmission (on each of channels CH0, CH1, and CH2) of code words indicative of an even number of pixels during the burst. In other embodiments, a video guard band word is repeated more than twice (or is transmitted only once) at the start of each video data burst.

In some embodiments of the invention, two (or more than two) streams of video data are transmitted (over one, two, or more than two channels). For example, two or more streams of video data can be transmitted in time-multiplexed fashion over each of one or more of Channels 0, 1, and 2 of FIG. 2. If bursts of different streams of video data are sequentially transmitted over one channel, different video guard band words can be transmitted at the start (and/or the end) of each burst, with each different stream being identified by a different video guard band word. Similarly, two (or more than two) streams of auxiliary data can be transmitted over one, two, or more than two channels). If bursts of different streams of auxiliary data are sequentially transmitted over one channel, different auxiliary guard band words can be transmitted at the start (and/or the end) of each burst, with each different stream being identified by a different guard band word.

Where encoded data are transmitted serially over multiple independent channels, DE shifts in individual channels can be corrected independently (in accordance with the invention) by using guard band words in each channel. Since there can be misalignment between the DE transitions indicated by the bits transmitted over multiple channels of a TMDS link (or TMDS-like link or other serial link) by one pixel clock cycle in either direction (due to ISI or other noise sources on the link), a set of identical guard band words (each a member of the set of inventive code words) is preferably transmitted in accordance with the invention at the start or end of each burst of data encoded using the inventive code words that is transmitted over each channel (e.g., at the end of the front porch of each channel, and/or at the start of the back porch of each channel, and/or at the end of the back porch of each channel). This can improve the channel to channel alignment and data integrity. The need to have available the appropriate number of guard band words is a factor in the selection of the inventive set of code words.

The purpose of repeating the transmission of a guard band word (either at the transition between an expected bit pattern and a burst of data encoded in accordance with the invention following such pattern, or at the transition between a burst of data encoded in accordance with the invention and an expected bit pattern that follows such data) is to prevent two types of misidentification of transitions: identifying the transition too early and identifying the transition too late. By transmitting a repeating sequence of N guard band words, the invention prevents such pixel shift errors up to N−1 pixels in either direction. For example, if a sequence of N post-data guard band words is appended to an encoded data burst, the invention ensures that when there is an N−1 pixel shift to the left, the last data value is not lost (only the post-data guard band word is lost). Generally, a sequence of only N−1 post-data guard band words is needed for use with a sequence of N pre-data guard band words.

In the preferred embodiment (indicated by FIG. 5), the auxiliary guard band words transmitted at the start and end of each auxiliary data burst on channels CH2 and CH1 are not transmitted at the start and end of each auxiliary data burst on channel CH0. Rather, special encoding is used to determine the first two and last two 10-bit inventive code words transmitted in each auxiliary data burst on channel CH0. Specifically, each of the first input auxiliary data packet to be encoded and the last input auxiliary data packet to be encoded comprises two bits (whereas all the other packet comprise four bits as described above). The first 2-bit input auxiliary packet is encoded as one of the words AD0, AD1, AD2, and AD3 in FIG. 4. The first two 10-bit words transmitted in the burst are repeated versions of the inventive code word that is indicative of this one of words AD0, AD1, AD2, and AD3 (and are thus indicative of the first two bits of input auxiliary data). Similarly, the last 2-bit input auxiliary packet is encoded as one of the words AD0, AD1, AD2, and AD3 in FIG. 4. The last two 10-bit words transmitted in the burst are repeated versions of the inventive code word that is indicative of this one of words AD0, AD1, AD2, and AD3 (and are thus indicative of the last two bits of input auxiliary data.

More generally, control or synchronization bits (e.g., the 10-bit control characters indicative of bits CTL0:CTL1 or CTL2:CTL3 in the TMDS specification) can produce different errors on video (or auxiliary) data bits that are transmitted just after the control characters, when ISI is present on the serial data transmission channel. This is preferably recognized and used as a factor in selecting the inventive code word set for use in transmitting the video (or auxiliary) data. Alternatively, the control codes sent just before the data (encoded in accordance with the invention) are controlled to reduce the ISI effect.

In other embodiments of the invention, bursts of encoded auxiliary data and bursts of encoded video data are transmitted over a serial link (which need not be a TMDS link), and the auxiliary data are encoded in accordance with the invention using a set of inventive code words. The set of inventive code words includes a "video" guard band word that is transmitted at the start of each encoded video data burst, and an "auxiliary" guard band word that is transmitted at the start of each encoded auxiliary data burst. In some implementations, the video guard band word is also used for a second purpose: to encode auxiliary data. In preferred implementations of such embodiments, the encoded video data are transmitted during active video periods in which a control signal "DE" is high (DE=1), and encoded control (or synchronization) signals and encoded auxiliary data are transmitted during blanking intervals (in which DE=0) between active video periods. A video guard band word is transmitted at the start of each active video period. Each blanking interval comprises a preamble (or "front porch") period (between the falling edge of DE and the start of a burst of auxiliary data) in which control (or sync) signals of a specific type are transmitted, an auxiliary data period (after the preamble period) comprising an auxiliary guard band word followed by a burst of encoded auxiliary data, and a "back porch" period between the auxiliary data period and the next active video period. In general, the purpose of using guard band words in accordance with the invention is to guarantee that the receiver can recognize the transition between the first guard band word transmitted at the start of an encoded data burst and the last bit transmitted before such guard band word, and between the last guard band word transmitted at the end of an encoded data burst and the first bit transmitted after such guard band word.

In a class of embodiments of the invention, a conventional encoding algorithm is used to encode primary data (which can but need not be video data) for transmission in bursts over a serial link, and auxiliary data (e.g., audio data or data of another type that can be transmitted with a lower data rate than the primary data) are encoded in accordance with the invention for transmission in bursts (between bursts of the encoded primary data) over a serial link. The full set of code words used for encoding the primary data has at least one code word for each of $2^N$ different words of the primary data (sometimes referred to as source data words). The inventive subset of such full set has at least one code word for each of not more than $2^M$ different words (where M<N) of the auxiliary data (also referred to sometimes as source data words). The auxiliary data are buffered and packed into M-bit format (i.e., into words each consisting of M bits). Each possible value of the M-bit source data has a preselected code in the $2^M$ word space provided by the inventive code words. The M-bit words of auxiliary data are mapped to inventive code words in the $2^M$ word space which are then transmitted over the link. The process by which the inventive set of code words is selected from a full set of code words is very important. The inventive set of code words is selected such that each stream of encoded data (comprising only inventive code words) transmitted over a serial link has a bit pattern that is less susceptible to ISI during transmission than is the bit pattern determined by a transmitted, conventionally encoded version of the same data (comprising not only inventive code words but also members of the full set that are not inventive code words). In general, the best choice for the particular inventive code words selected from a full set of binary code words depends on the particular coding implemented by the full set (i.e., the details of which bits of each code word in the full set are zeroes and which are ones). In preferred embodiments, the inventive code words are selected to be those whose serial patterns (during transmission over a serial link) have fewer contiguous zeros and ones (and thus are less susceptible to ISI during transmission) than do those code words in the full set that are not selected.

In choosing which of the inventive code words to employ to transmit encoded data (e.g. auxiliary data distinct from video data) in accordance with the invention, it is important to consider that some bits (of multi-bit encoded words) present greater risks of error than other such bits. For example, when using TMDS-encoded words to transmit auxiliary data, the DC balancing bits and transition control bits (e.g., bits Q[9] and Q[8]) present greater error risks than do the other bits. Any bit error occurring during processing of the DC balancing and transition control bits can affect other bits of the multi-bit encoded words. Hence a one-bit error in one of the critical bits is translated into a burst error. This effect is preferably considered in selecting the inventive code words from a full set of TMDS-encoded words.

It should be understood that while certain forms of the present invention are illustrated and described herein, the invention is defined by the claims and is not to be limited to the specific embodiments described and shown.

What is claimed is:

1. A communication system, including:
   a receiver;
   a transmitter; and
   a serial link between the transmitter and the receiver, wherein the transmitter is coupled to receive input data, configured to generate a sequence of selected code words by encoding the input data, and configured to transmit the sequence of selected code words to the receiver over the serial link, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein the input data are auxiliary data, the transmitter is coupled to receive video data and configured to generate a sequence of video code words by encoding the video data, and the transmitter is configured to transmit to the receiver over the serial link a first burst of the video code words followed by a burst of the selected code words followed by a second burst of the video code words, wherein each of the video code words is a member of the full code word set and at least one of the video code words is not a member of the robust subset.

2. The system of claim 1, wherein the transmitter is also coupled to receive control bits, configured to generate bursts of encoded control words by encoding the control bits, and configured to transmit to the receiver over the serial link a first burst of the encoded control words between the first burst of the video code words and the burst of the selected code words, and a second burst of the encoded control words between the burst of the selected code words and the second burst of the video code words.

3. The system of claim 2, wherein the selected code words include at least one guard band word, the burst of the selected code words has an initial word, and the initial word is the guard band word.

4. The system of claim 2, wherein the selected code words include at least one guard band word, the burst of the selected code words has an initial set of words, and each word of the initial set of words is one said guard band word.

5. The system of claim 2, wherein the selected code words include at least one guard band word, the burst of the selected code words has a final word, and the final word is the guard band word.

6. The system of claim 2, wherein the selected code words include at least one guard band word, the burst of the selected code words has a final set of words, and each word of the final set of words is one said guard band word.

7. The system of claim 2, wherein the serial link is a TMDS link, and the selected code words consist of seventeen different, transition-minimized TMDS code words, including at least one transition-minimized TMDS code word used as a guard band word.

8. The system of claim 2, wherein the selected code words include at least two guard band words, including a first guard band word and a second guard band word, the second burst of the video code words has an initial word, the initial word of the second burst of the video code words is the first guard band word, the burst of the selected code words has an initial word, and the initial word of the burst of the selected code words is the second guard band word.

9. The system of claim 8, wherein the serial link is a TMDS link, and the selected code words consist of seventeen different, transition-minimized TMDS code words, including one transition-minimized TMDS code word used only as said second guard band word and another transition-minimized TMDS code word used as said first guard band and also used as one of the selected code words in said burst of the selected code words.

10. The system of claim 1, wherein the input data are auxiliary data, the transmitter is coupled to receive video data and configured to generate a sequence of video code words by encoding the video data, and the transmitter is configured to transmit to the receiver over the serial link the first burst of the video code words followed by at least two bursts of the selected code words followed by the second burst of the video code words.

11. The system of claim 10, wherein the transmitter is also coupled to receive control bits, configured to generate bursts of encoded control words by encoding the control bits, and configured to transmit to the receiver over the serial link a first burst of the encoded control words between the first burst of the video code words and the bursts of the selected code words, and a second burst of the encoded control words between the bursts of the selected code words and the second burst of the video code words.

12. The system of claim 11, wherein the selected code words include at least one guard band word, a first one of the bursts of the selected code words has an initial word, and the initial word is the guard band word.

13. The system of claim 11, wherein the selected code words include at least one guard band word, a first one of the bursts of the selected code words has an initial set of words, and each word of the initial set of words is one said guard band word.

14. A communication system, including:
a receiver;
a transmitter; and
a serial link between the transmitter and the receiver, wherein the transmitter is coupled to receive input data, configured to generate a sequence of selected code words by encoding the input data, and configured to transmit the sequence of selected code words to the receiver over the serial link, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein the input data are auxiliary data, the transmitter is coupled to receive video data and configured to generate a sequence of video code words by encoding the video data, and the transmitter is configured to transmit to the receiver over the serial link a burst of the selected code words followed by a burst of the video code words, wherein each of the video code words is a member of the full code word set and at least one of the video code words is not a member of the robust subset.

15. The system of claim 14, wherein the transmitter is also coupled to receive control bits, configured to generate bursts of encoded control words by encoding the control bits, and configured to transmit to the receiver over the serial link a burst of the encoded control words between the burst of the selected code words and the burst of the video code words.

16. The system of claim 15, wherein the selected code words include at least one guard band word, the burst of the video code words has an initial word, and the initial word is the guard band word.

17. The system of claim 15, wherein the selected code words include at least one guard band word, the burst of the video code words has an initial set of words, and each word of the initial set of words is one said guard band word.

18. A communication system, including:
a receiver;
a transmitter; and
a serial link between the transmitter and the receiver, wherein the transmitter is coupled to receive input data, configured to generate a sequence of selected code words by encoding the input data, and configured to transmit the sequence of selected code words to the receiver over the serial link, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein each of the selected code words is an L-bit binary word, each of at least a subset of the selected code words is indicative of an M-bit word of the input data, L=10, M=4, and the transmitter is coupled to receive source words of the input data, where each of the source words comprises N bits, N is less than L, and N is greater than M, and the transmitter is configured to pack the source words into M-bit words of the input data and to encode each of the M-bit words of the input data as one of the selected code words.

19. A communication system, including:
a receiver;
a transmitter; and
a serial link between the transmitter and the receiver, wherein the transmitter is coupled to receive input data, configured to generate a sequence of selected code words by encoding the input data, and configured to transmit the sequence of selected code words to the receiver over the serial link, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein each of the selected code words is indicative of L binary bits, and the selected code words have fewer contiguous zero bits and contiguous one bits per code word on the average than do the code words of the full code word set excluding the selected code words.

20. A communication system, including:
a receiver;
a transmitter; and
a serial link between the transmitter and the receiver, wherein the transmitter is coupled to receive input data, configured to generate a sequence of selected code words by encoding the input data, and configured to transmit the sequence of selected code words to the receiver over the serial link, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein each of the selected code words is indicative of a different sequence of binary bits, the transmitter is configured to transmit the sequence of selected code words to the receiver over the serial link as a sequence of rising and falling voltage transitions, and the selected code words have bit patterns that implement DC balancing by limiting voltage drift of the serial link during transmission of said sequence of selected code words to a predetermined amount.

21. A communication system, including:
a receiver;
a transmitter; and
a serial link, a second serial link, and a third serial link between the transmitter and the receiver, wherein the transmitter is coupled to receive input data and video data, configured to generate sequences of selected code words by encoding the input data and to generate sequences of video code words by encoding the video data, and configured to transmit to the receiver over the serial link a burst of the selected code words followed by a burst of the video code words, to transmit to the receiver over the second serial link a second burst of the selected code words followed by a second burst of the video code words, and to transmit to the receiver over the third serial link a third burst of the selected code words followed by a third burst of the video code words,
wherein each of the selected code words is a member of a robust subset of a full code word set, each of the video code words is a member of the full code word set, and at least one of the video code words is not a member of the robust subset, and
wherein the input data determined by the burst of the selected code words can be encoded as a first conventional sequence of the code words of the full code word set, the input data determined by the second burst of the selected code words can be encoded as a second conventional sequence of the code words of the full code word set, and the input data determined by the third burst of the selected code words can be encoded as a third conventional sequence of the code words of the full code word set, and wherein said burst of the selected code words is less susceptible to inter-symbol interference during transmission over the serial link than would be the first conventional sequence, said second burst of the selected code words is less susceptible to inter-symbol interference during transmission over the second serial link than would be the second conventional sequence, and said third burst of the selected code words is less susceptible to inter-symbol interference during transmission over the third serial link than would be the third conventional sequence.

22. The system of claim 21, wherein the transmitter is also coupled to receive control bits, configured to generate sequences of encoded control words by encoding the control bits, and configured to transmit to the receiver over the serial link a burst of the encoded control words between the burst of the selected code words and the burst of the video code words, to transmit to the receiver over the second serial link a second burst of the encoded control words between the second burst of the selected code words and the second burst of the video code words, and to transmit to the receiver over the third serial link a third burst of the encoded control words between the third burst of the selected code words and the third burst of the video code words.

23. The system of claim 21, wherein the serial link is a first video channel of a TMDS link, the second serial link is a second video channel of the TMDS link, and the third serial link is a third video channel of the TMDS link.

24. The system of claim 23, wherein the selected code words consist of seventeen different TMDS code words, including at least one TMDS code word used only as a guard band word.

25. The system of claim 23, wherein the selected code words consist of seventeen, different, transition-minimized TMDS code words, including at least one transition-minimized TMDS code word used only as a guard band word.

26. A transmitter for use in data transmission over a serial link, said transmitter including:
at least one input for receiving input data;
an output configured to be coupled to a channel of the link; and
circuitry, coupled to each said input and to the output, and configured to generate a sequence of selected code words by encoding the input data and to assert the sequence of selected code words to the output in response to the input data, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein the input data include auxiliary data and video data, and the circuitry is configured to generate a sequence of video code words by encoding the video data, and to assert to the output a first burst of the video code words followed by a burst of the selected code words followed by a second burst of the video code words, wherein each of the video code words is a member of the full code word set and at least one of the video code words is not a member of the robust subset.

27. The transmitter of claim 26, wherein the circuitry is also coupled to receive control bits, configured to generate bursts of encoded control words by encoding the control bits, and to assert to the output a first burst of the encoded control words between the first burst of the video code words and the burst of the selected code words, and a second burst of the encoded control words between the burst of the selected code words and the second burst of the video code words.

28. The transmitter of claim 27, wherein the selected code words include at least one guard band word, the burst of the selected code words has an initial word, and the initial word is the guard band word.

29. The transmitter of claim 27, wherein the selected code words include at least one guard band word, the burst of the selected code words has an initial set of words, and each word of the initial set of words is one said guard band word.

30. The transmitter of claim 27, wherein the selected code words include at least one guard band word, the burst of the selected code words has a final word, and the final word is the guard band word.

31. The transmitter of claim 27, wherein the selected code words include at least one guard band word, the burst of the selected code words has a final set of words, and each word of the final set of words is one said guard band word.

32. The transmitter of claim 27, wherein the serial link is a TMDS link, and the selected code words consist of seventeen different, transition-minimized TMDS code words, including at least one transition-minimized TMDS code word used as a guard band word.

33. The transmitter of claim 27, wherein the selected code words include at least two guard band words, including a first guard band word and a second guard band word, the second burst of the video code words has an initial word, the initial word of the second burst of the video code words is the first guard band word, the burst of the selected code words has an initial word, and the initial word of the burst of the selected code words is the second guard band word.

34. The transmitter of claim 33, wherein the serial link is a TMDS link, and the selected code words consist of seventeen different, transition-minimized TMDS code words, including one transition-minimized TMDS code word used only as said second guard band word and another transition-minimized TMDS code word used as said first guard band and also used as one of the selected code words in said burst of the selected code words.

35. The transmitter of claim 26, wherein the serial link is a TMDS link, and the selected code words consist of seventeen different TMDS code words, including at least one TMDS code word used only as a guard band word.

36. The transmitter of claim 35, wherein the selected code words consist of seventeen different, transition-minimized TMDS code words, including at least one transition-minimized TMDS code word used only as the guard band word.

37. The transmitter of claim 26, wherein the circuitry is configured to assert to the output the first burst of the video code words followed by at least two bursts of the selected code words followed by the second burst of the video code words.

38. A transmitter for use in data transmission over a serial link, said transmitter including:
 at least one input for receiving input data;
 an output configured to be coupled to a channel of the link; and
 circuitry, coupled to each said input and to the output, and configured to generate a sequence of selected code words by encoding the input data and to assert the sequence of selected code words to the output in response to the input data, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein each of the selected code words is an L-bit binary word, each of at least a subset of the selected code words is indicative of an M-bit word of the input data, L=10, M=4, and the circuitry is coupled to receive source words of the input data, where each of the source words comprises N bits, N is less than L, and N is greater than M, and the circuitry is configured to pack the source words into M-bit words of the input data and to encode each of the M-bit words of the input data as one of the selected code words.

39. A transmitter for use in data transmission over a serial link, said transmitter including:
 at least one input for receiving input data;
 an output configured to be coupled to a channel of the link; and
 circuitry, coupled to each said input and to the output, and configured to generate a sequence of selected code words by encoding the input data and to assert the sequence of selected code words to the output in response to the input data, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein each of the selected code words is indicative of a sequence of L binary bits, and the selected code words have fewer contiguous zero bits and contiguous one bits per code word on the average than do the code words of the full code word set excluding the selected code words.

40. A transmitter for use in data transmission over a serial link, said transmitter including:
 at least one input for receiving input data;
 an output configured to be coupled to a channel of the link; and
 circuitry, coupled to each said input and to the output, and configured to generate a sequence of selected code words by encoding the input data and to assert the sequence of selected code words to the output in response to the input data, wherein each of the selected code words is a member of a robust subset of a full code word set, the input data can be encoded as a conventional sequence of code words of the full code word set, and the sequence of selected code words is less susceptible to inter-symbol interference during transmission over the link than would be the conventional sequence of code words, wherein each of the selected code words is indicative of a different sequence of binary bits, the circuitry is configured to assert the sequence of selected code words as a sequence of rising and falling voltage transitions, and the selected code words have bit patterns that implement DC balancing by limiting voltage drift of the serial link during transmission of said sequence of selected code words to a predetermined amount.

41. A method for encoding data for transmission over a serial link, said method including the steps of:
 (a) providing words of input data capable of being encoded as a conventional sequence of code words of a full code word set;
 (b) generating a sequence of selected code words by encoding the input data, wherein each of the selected code words is a member of a robust subset of the full code word set, and the sequence of selected code words is less susceptible to inter-symbol interference during transmission over the link than would be the conventional sequence of code words;
 generating bursts of encoded control words by encoding control bits; and
 transmitting over the link a first burst of the encoded control words between a first burst of the video code words and the burst of the selected code words, and a second burst of the encoded control words between the burst of the selected code words and a second burst of the video code words.

42. The method of claim 41, wherein the selected code words include at least one guard band word, the burst of the selected code words has an initial word, and the initial word is the guard band word.

43. The method of claim 41, wherein the selected code words include at least one guard band word, the burst of the selected code words has an initial set of words, and each word of the initial set of words is one said guard band word.

44. The method of claim 41, wherein the selected code words include at least one guard band word, the burst of the selected code words has a final word, and the final word is the guard band word.

45. The method of claim 41, wherein the selected code words include at least one guard band word, the burst of the selected code words has a final set of words, and each word of the final set of words is one said guard band word.

46. The method of claim 41, wherein the selected code words consist of seventeen different, transition-minimized TMDS code words, including at least one transition-minimized TMDS code word used as a guard band word.

47. The method of claim 41, wherein the selected code words include at least two guard band words, including a first guard band word and a second guard band word, the second burst of the video code words has an initial word, the initial word of the second burst of the video code words is the first guard band word, the burst of the selected code words has an initial word, and the initial word of the burst of the selected code words is the second guard band word.

48. The method of claim 47, wherein the selected code words consist of seventeen different, transition-minimized TMDS code words, including one transition-minimized TMDS code word used only as said second guard band word and another transition-minimized TMDS code word used as said first guard band and also used as one of the selected code words in said burst of the selected code words.

49. The method of claim 41, wherein the input data are auxiliary data, and also including the steps of:

generating a sequence of video code words by encoding video data; and transmitting over the link a first burst of the video code words followed by a burst of the selected code words followed by a second burst of the video code words, wherein each of the video code words is a member of the full code word set and at least one of the video code words is not a member of the robust subset.

50. The method of claim 41, wherein the input data are auxiliary data, and also including the steps of:

generating a sequence of video code words by encoding video data; and transmitting over the link a first burst of the video code words followed by at least two bursts of the selected code words followed by a second burst of the video code words.

51. A method for encoding data for transmission over a serial link, said method including the steps of:

(a) providing words of input data capable of being encoded as a conventional sequence of code words of a full code word set; and (b) generating a sequence of selected code words by encoding the input data, wherein each of the selected code words is a member of a robust subset of the full code word set, and the sequence of selected code words is less susceptible to inter-symbol interference during transmission over the link than would be the conventional sequence of code words, wherein each of the selected code words is an L-bit binary word, each of at least a subset of the selected code words is indicative of an M-bit word of the input data, L=10, M=4, and step (a) includes the step of providing source words of the input data, where each of the source words comprises N bits, N is less than L, and N is greater than M, and step (b) includes the steps of packing the source words into M-bit words of the input data and encoding each of the M-bit words of the input data as one of the selected code words.

52. A method for encoding data for transmission over a serial link, said method including the steps of:

(a) providing words of input data capable of being encoded as a conventional sequence of code words of a full code word set; and (b) generating a sequence of selected code words by encoding the input data, wherein each of the selected code words is a member of a robust subset of the full code word set, and the sequence of selected code words is less susceptible to inter-symbol interference during transmission over the link than would be the conventional sequence of code words, wherein each of the selected code words is indicative of a sequence of L binary bits, and the preferred words have fewer contiguous zero bits and contiguous one bits per code word on the average than do the non-preferred words of the full set.

53. A method for encoding data for transmission over a serial link, said method including the steps of:

(a) providing words of input data capable of being encoded as a conventional sequence of code words of a full code word set; and (b) generating a sequence of selected code words by encoding the input data, wherein each of the selected code words is a member of a robust subset of the full code word set, and the sequence of selected code words is less susceptible to inter-symbol interference during transmission over the link than would be the conventional sequence of code words, wherein each of the selected code words is indicative of a different sequence of binary bits, and also including the step of:

transmitting the sequence of selected code words over the serial link as a sequence of rising and falling voltage transitions, wherein the selected code words have bit patterns that implement DC balancing by limiting voltage drift of the serial link during transmission of said sequence of selected code words to a predetermined amount.

* * * * *